United States Patent [19]

Carle

[11] Patent Number: 5,323,556
[45] Date of Patent: Jun. 28, 1994

[54] TRAP FOR CATCHING MOSQUITOES OR ALL NIGHT FLYING INSECTS AND METHOD THEREFOR

[76] Inventor: Arthur Carle, 2721, rue Plamondon, Longueuil, Quebec, Canada, J4L 1S1

[21] Appl. No.: 32,318
[22] Filed: Mar. 17, 1993
[51] Int. Cl.⁵ .................................. A01M 1/04
[52] U.S. Cl. ............................. 43/139; 43/113
[58] Field of Search ......................... 43/113, 139

[56] References Cited

U.S. PATENT DOCUMENTS

| | | |
|---|---|---|
| 783,752 | 2/1905 | Marston . |
| 959,155 | 5/1910 | Nault . |
| 993,644 | 5/1911 | Brisbane . |
| 1,478,424 | 12/1923 | Cross . |
| 1,497,540 | 6/1924 | Bowen .................... 43/139 |
| 1,807,550 | 5/1931 | Rector . |
| 2,384,930 | 9/1945 | Kendrick . |
| 2,780,026 | 2/1957 | Dail ......................... 43/139 |
| 2,829,384 | 4/1958 | Studler ..................... 43/139 |
| 3,120,075 | 2/1964 | Barnhart ................... 43/113 |
| 3,152,420 | 10/1964 | Pawl ........................ 43/139 |
| 3,796,001 | 3/1974 | Jackson .................... 43/113 |
| 4,282,673 | 8/1981 | Focks et al. . |
| 4,625,453 | 12/1986 | Smith ....................... 43/139 |
| 5,116,219 | 5/1992 | Zimmerman ................ 43/139 |
| 5,167,090 | 12/1992 | Cody ........................ 43/139 |

*Primary Examiner*—Kurt C. Rowan

[57] ABSTRACT

The trap includes an enclosure from which it is possible to draw air therefrom thereby reducing pressure therein. An opening is provided in the enclosure which enables outside air to be drawn therein as a result of the reduced pressure, and through which mosquitoes or night flying insects can be sucked inside the enclosure. A container which is associated with the enclosure and is separate from the device that draws air therefrom receives mosquitoes or night flying insects which have been sucked into the enclosure. The insects should be directed toward the container without contacting the air drawing device. By operating the device in an environment loaded with mosquitoes or night flying insects, most if not all of them are collected inside the enclosure.

4 Claims, 2 Drawing Sheets

TRAP FOR CATCHING MOSQUITOES OR ALL NIGHT FLYING INSECTS AND METHOD THEREFOR

BACKGROUND OF INVENTION (a) Field of the Invention

This invention relates to a trap and a method for catching mosquitoes or night flying insects. More particularly, the invention is concerned with a device and a method operating under suction to draw in night flying insects, more specifically mosquitoes, into an enclosure, to dispose of them.

(b) Description of Prior Art

Although the insects play an important part in the equilibrium of nature, it remains that some of them may be very harmful to humans in being responsible for the transmission of serious diseases. Furthermore, in residential areas and in the country they may become very annoying to the extent that it is sometimes impossible to stay outside even when the temperature is ideal. Natural and chemical insecticides and repellents are known, but it has been found that they do not give full satisfaction. It is particularly hard to get rid of night flying insects, especially mosquitoes, which are extremely annoying at sunset. Insecticides and known traps do not give good results, so that during the nicest evenings of the year it is practically impossible to stay outside for relaxation or to practice a sporting activity.

A number of devices have been disclosed which use suction to collect flying insects. For example, U.S. Pat. No. 783,752 discloses combination of a blower and a light which acts as an attractant for drawing in insects and sending them into a receptacle. It will be noted that the insects have to go through the blower before being sent to the receptacle.

U.S. Pat. No. 959,155 is a modification of U.S. Pat. No. 783,752 which includes a trap having a trap door operated by a spring at the discharge end of the tube connected to the blower.

U.S. Pat. No. 993,644 describes placing a tank of liquid between the blower and the inlet into the tube.

U.S. Pat. No. 1,478,424 is somewhat similar to U.S. Pat. No. 783,752 except that an insect collecting bell is provided which has a specific parabolic shape.

U.S. Pat. No. 1,807,550 is another system of the same type where a special type of reflector is provided in the trapping compartment.

U.S. Pat. No. 2,384,930 describes an insect trap which also includes a light attractant, a fan and receiving means for the insects propelled by the fan. U.S. Pat. No. 4,282,673 discloses a device of the same type and including a parabolic reflector.

It will be noted that all the above devices provide for the insects to travel through the blades of a fan as they are propelled toward a collector. This is of course a serious disadvantage as the trap cannot be operated for any appreciable length of time before it needs to be cleaned.

SUMMARY OF THE INVENTION

It is therefore an object of the present invention to provide a trap for catching night flying insects, such as mosquitoes, that is free of maintenance and which gives excellent results.

It is another object of the present invention to provide a method of collecting night flying insects, particularly mosquitoes, from an outside environment.

These and other objects of the present invention may be achieved by providing a trap for night flying insects which comprises:

an enclosure, means for drawing out air from the enclosure, thereby reducing pressure therein, a front opening in the enclosure enabling outside air to be drawn therein as a result of said reduced pressure and through which night flying insects can be sucked inside the enclosure, a container associated with the enclosure and separate from the air drawing means to receive the night flying insects which have been sucked into the enclosure, and means for directing the sucked flying insects toward the container while preventing them from contacting the air drawing means.

In accordance with a preferred embodiment of the invention, the enclosure is shaped as a rectangular box. Additionally, the trap may comprise lighting means disposed in the first opening to act as a night flying insect attractant.

In accordance with another preferred embodiment, the air drawing means comprise a fan disposed in a second opening provided in a wall of the rectangular box, spaced from the first opening, the fan acting to draw air from inside the enclosure and direct air towards the exterior.

In accordance with another preferred embodiment of the invention, an inwardly conical hollow shaped member is disposed in the first opening the conical member holding a light socket, and a light is mounted in the socket, the conical member communicating with the container.

In accordance with another embodiment, the fan and the light are electrically connected to a current source, and a switch is provided to start and close the fan and said light.

In accordance with yet another embodiment, a rectangular aperture is formed in a vertical wall of the rectangular box, the container consists of a drawer like member having an upper cover of perforated material, a third opening is formed in said upper cover, and an elbow shaped duct is connected at one end to the conical member and at the other end to the third opening.

A flap may be provided in the duct to direct sucked flying insects toward the third opening into the container.

In accordance with yet another embodiment of the invention, there is provided a method of attracting and catching night flying insects which comprises providing a trap wherein a fan draws air therefrom, the trap having an opening capable of sucking in night flying insects and a removable container in communication with said opening to receive sucked in insects, placing the trap in an environment where the flying insects are present, operating the trap and removing the container to dispose of the night flying insects.

DESCRIPTION OF PREFERRED EMBODIMENT

Figure 1:
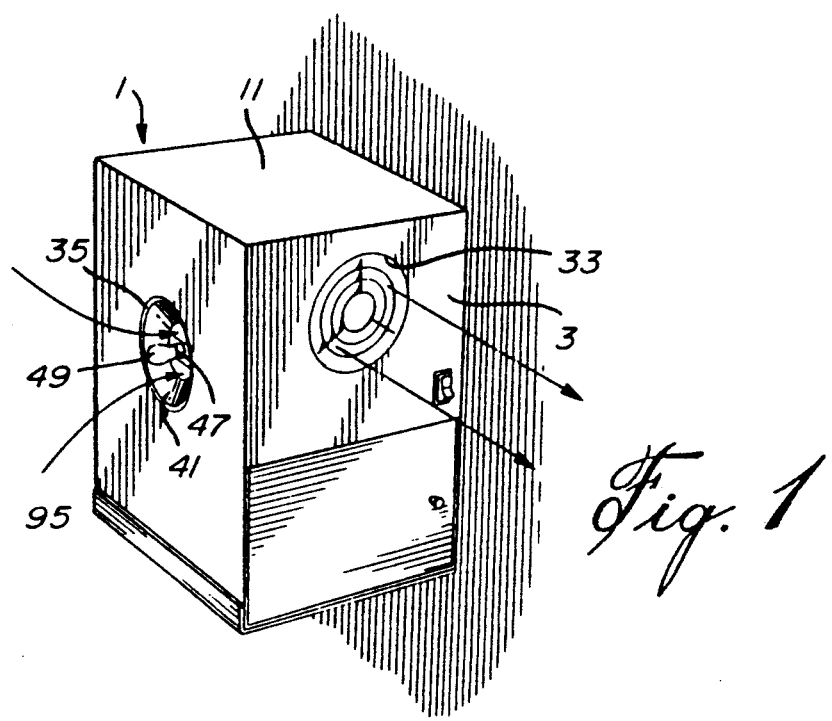
FIG. 1 shows the device in perspective.
Figure 2:
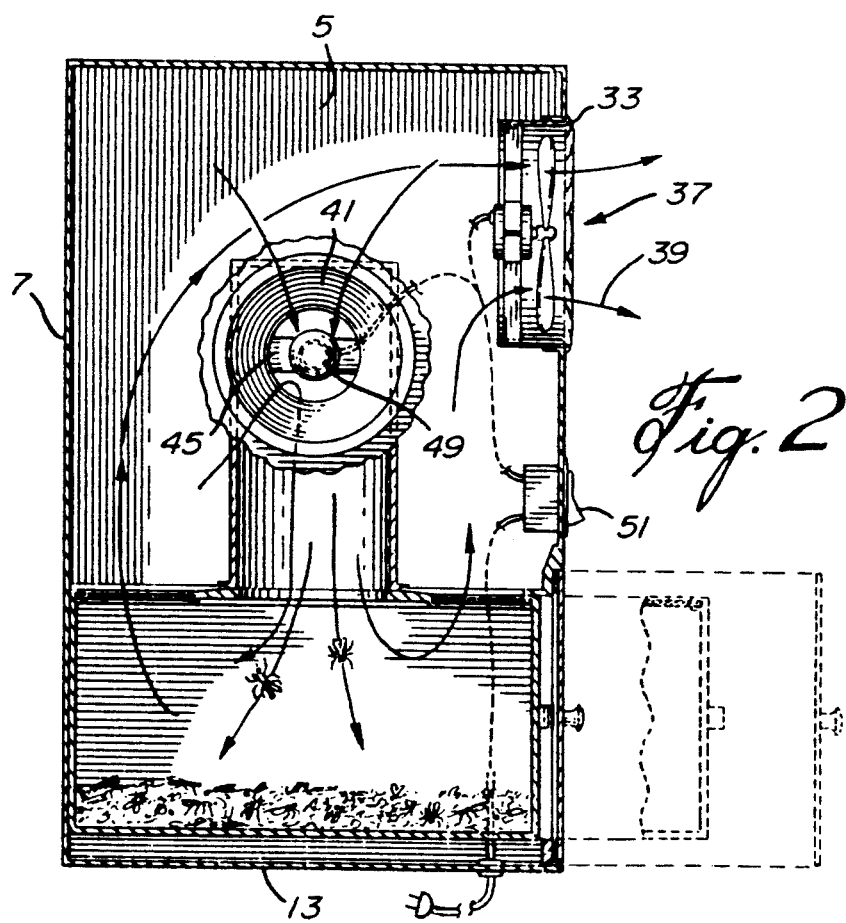
FIG. 2 shows a side view of the device.
Figure 3:
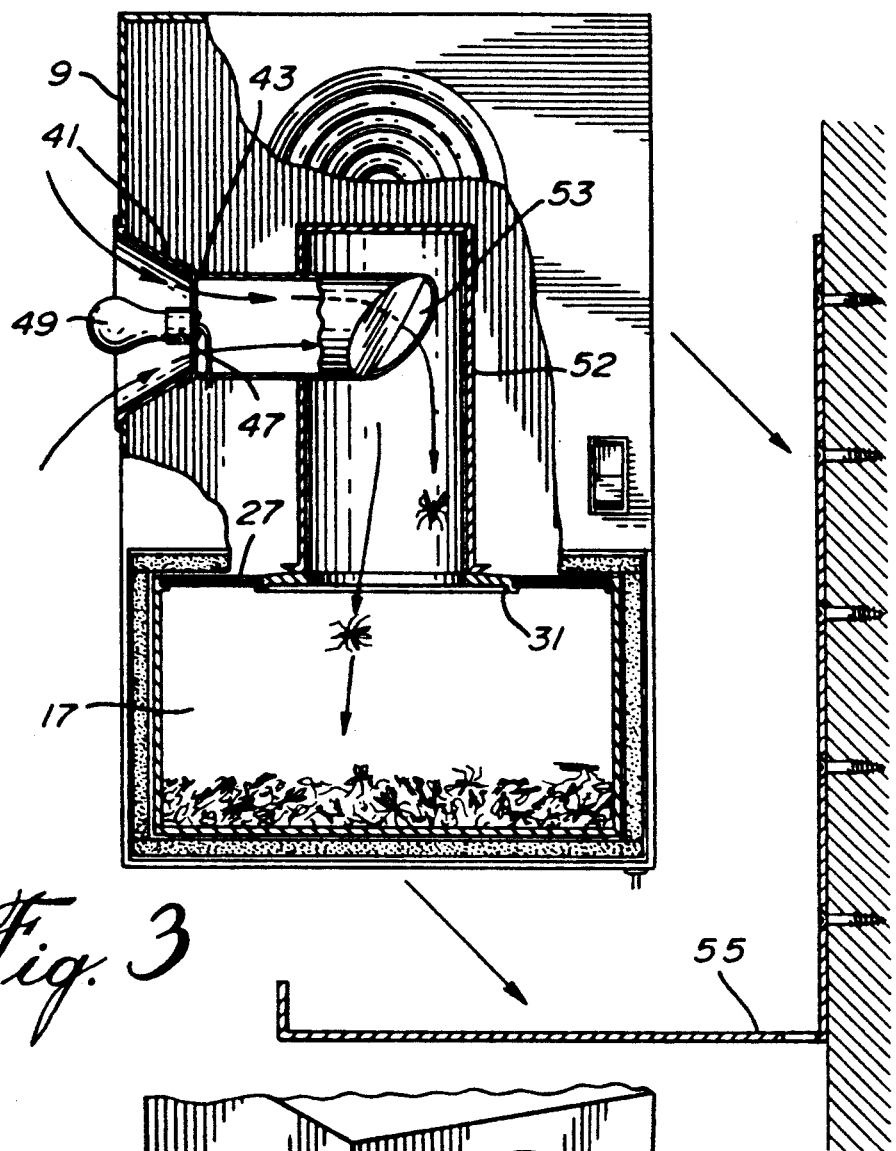
FIG. 3 shows an end view of the device.
Figure 4:
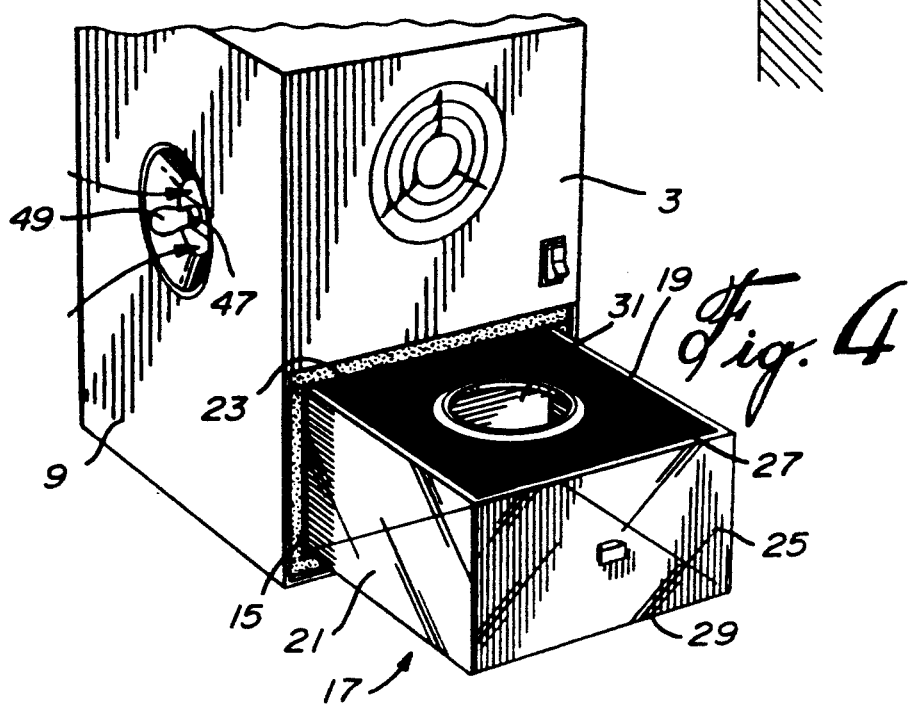
FIG. 4 shows the device in perspective with the drawer opened.

Referring the drawings, it will be seen that a trap for night flying insects, such as mosquitoes, according to the invention comprises a rectangular box 1 having vertical walls 3, 5, 7 and 9, top wall 11 and bottom wall 13. It will be noted that front wall 3 terminates short of the bottom wall 13 to define an aperture 15. The trap also comprises a drawer like member 17 having vertical walls 19, 21, 23 and 25, top wall 27 and bottom wall 29. In the model illustrated, the rectangular box 1 is all made of PLEXIGLASS ® while the entire drawer like member 17 except for top wall 27 is also made of PLEXIGLASS ®. All the edges are sealed in a manner known per se to prevent any escape or entry of air at the junctions between panels of PLEXIGLASS ®. Turning now to top wall 27 of drawer like member 17, it will be seen to consist of a perforated panel enabling air to pass therethrough and to comprise a circular opening 31, the purpose of which will be defined later. Drawer member 17 is shaped to fit exactly inside box 1 by sliding it through aperture 15. Once the drawer 17 is fitted inside the box, aperture 17 is tightly closed by means of door 32. Returning to box 1, it will be noted that an opening 33 is formed in vertical wall 3, while another opening 35 is formed in vertical wall 9. A standard rotary fan 37 is mounted in known manner in opening 33, and is arranged so that the air flow which is produced when it is in operation is directed towards the exterior in the direction indicated by the arrow 39. The rectangular box 1 also comprises an inwardly conical shaped hollow member 41 which is mounted in opening 35. In other words, at the level of opening 35 the conical member 41 has a substantially longer diameter than at the inner end thereof at 43. Conical member 41 has a brace system 45 to hold a socket 47 in which a light 49 is received. Both the fan 37 and the light 49 are mounted in series and are electrically connected to switch 51, which controls the operation of the trap.

Inside box 1, an L-shaped elbow duct 52 connects the inner end 43 of the conical member 41 with the opening 31. In the model illustrated, the lower end of duct 52 terminates just short of top wall 27 opposite opening 31, to permit a back and forth movement of drawer member 17.

Inside the duct 51, in the elbow portion thereof, there is a flap 53 which enables to direct the night flying insects that have been sucked at conical member 41 toward the opening 31 without clogging up duct 52 with dead insects.

The trap may suitably be mounted along a wall using support 55, although any other arrangement is within the scope and spirit of the present invention.

The operation of the device according to the invention is as follows. The trap is placed on support 55 in an environment where it is desired to get rid of mosquitoes. Switch 51 is opened to operate fan 37 and light 49. The mosquitoes are naturally attracted by a light and those in the above mentioned environment will fly toward the light. As soon as they reach the vicinity of the light 49 they will be sucked into conical member 41, will fall under gravity, and will eventually be collected in drawer member 17 via duct 52. When the trap has been operated for a while, the drawer member is emptied of its content and the trap is ready for another operation.

I claim:

1. A trap for night flying insects which comprises an enclosure which is shaped as a rectangular box, means for drawing out air from said enclosure, thereby reducing pressure therein,
a first opening in said enclosure enabling outside air to be drawn therein as a result of said reduced pressure and through which night flying insects can be sucked inside said enclosure,
a rectangular aperture formed in a vertical wall of said rectangular box and a drawer-like member slidable in and out of said rectangular box through said rectangular aperture, said drawer-like member having an upper cover of perforated material, a third opening formed in said upper cover, said drawer-like member to receive night flying insects which have been sucked into said enclosure,
an inwardly conical hollow shaped member disposed in said first opening, said conical member holding a light socket, and a light mounted in said socket to act as a night flying insect attractant, and
an elbow shaped duct connected at one end to said conical member and at the other end to said third opening.

2. A trap for night flying insects according to claim 1, wherein said air drawing means comprise a fan disposed in a second opening provided in a wall of said rectangular box, spaced from said first opening, said fan acting to draw air from inside said enclosure and direct said air towards the exterior.

3. A trap for night flying insects according to claim 1, wherein a flap is provided in said duct to direct sucked night flying insects toward said third opening into said container, under gravity.

4. A method of attracting and catching night flying insects which comprises providing a trap wherein a fan draws air therefrom to reduce pressure therein, said trap having a first opening enabling outside air to be drawn therein as a result of said reduced pressure, and sucking in night flying insects through said first opening, said trap being shaped as a rectangular box having a rectangular aperture formed in a vertical wall thereof and a drawer-like member slidable in and out of said rectangular box through said rectangular aperture, said drawer-like member having an upper cover of perforated material, a third opening formed in said upper cover allowing the night flying insects which have been sucked into the trap, said trap also including an inwardly conical hollow shaped member disposed in said first opening, said conical member holding a light socket and a light mounted on said socket to act as a night flying insect attractant, and an elbow shaped duct connected at one end to said conical member and at the other end to said third opening, placing said trap in an environment where said night flying insects are present, operating said trap and removing said drawer-like member to disposed of said night flying insects.

* * * * *